(12) United States Patent
Etter et al.

(10) Patent No.: US 8,789,429 B2
(45) Date of Patent: *Jul. 29, 2014

(54) FLOWMETER STRUCTURE FOR A BEVERAGE MACHINE

(75) Inventors: Stefan Etter, Kehrsatz (CH); Martin Ziegler, Köniz (CH)

(73) Assignee: Nestec S.A., Vevey (CH)

( * ) Notice: Subject to any disclaimer, the term of this patent is extended or adjusted under 35 U.S.C. 154(b) by 348 days.

This patent is subject to a terminal disclaimer.

(21) Appl. No.: 13/378,608

(22) PCT Filed: Jun. 21, 2010

(86) PCT No.: PCT/EP2010/058691
§ 371 (c)(1),
(2), (4) Date: Dec. 15, 2011

(87) PCT Pub. No.: WO2010/149602
PCT Pub. Date: Dec. 29, 2010

(65) Prior Publication Data
US 2012/0090472 A1    Apr. 19, 2012

(30) Foreign Application Priority Data
Jun. 25, 2009  (EP) .................................. 09163815

(51) Int. Cl.
*G01F 1/05*  (2006.01)
(52) U.S. Cl.
USPC ..................................................... 73/861.79
(58) Field of Classification Search
USPC .............. 73/861.79, 861.77, 861.94; 210/739
See application file for complete search history.

(56) References Cited

U.S. PATENT DOCUMENTS

| | | | |
|---|---|---|---|
| 4,101,874 A | 7/1978 | Denison et al. | 340/606 |
| 4,265,127 A | 5/1981 | Onoda | 73/861.78 |
| 4,393,724 A | 7/1983 | Werkmann et al. | 73/861.91 |
| 4,430,901 A | 2/1984 | Rogers | 73/861.33 |
| 4,666,061 A | 5/1987 | Pluess | 222/71 |
| 5,433,118 A | 7/1995 | Castillo | 73/861.77 |
| 5,679,906 A | 10/1997 | Van Cleve et al. | 73/861.353 |
| 5,866,824 A | 2/1999 | Schieber | 73/861.79 |
| 5,876,610 A * | 3/1999 | Clack et al. | 210/739 |

(Continued)

FOREIGN PATENT DOCUMENTS

| | | |
|---|---|---|
| DE | 77 38 382 U1 | 4/1978 |
| DE | 202007003419 U1 | 4/2007 |

(Continued)

OTHER PUBLICATIONS

International Search Report and Written Opinion, PCT/EP2010/058691, mailed Jul. 28, 2010.

(Continued)

*Primary Examiner* — Jewel V Thompson
(74) *Attorney, Agent, or Firm* — K&L Gates LLP

(57) ABSTRACT

A flowmeter that includes a moulded housing delimiting a measuring chamber; a rotatable measuring body having a rotatable shaft extending across the measuring chamber; and point bearings for mounting and positioning opposite extremities of the rotatable shaft in the housing. Each point bearing is formed of a protruding part and a cooperating facing counter-part part, in particular a recessed part, associated, respectively, with the housing and an extremity of the rotatable shaft, or vice versa. This protruding part and its counter-part are integrally formed with their associated moulded housing and rotatable shaft.

19 Claims, 2 Drawing Sheets

(56) References Cited

U.S. PATENT DOCUMENTS

| | | | |
|---|---|---|---|
| 5,943,472 A | 8/1999 | Charles et al. | 392/396 |
| 5,965,826 A | 10/1999 | Von Bertrab | 73/861.87 |
| RE36,401 E | 11/1999 | Fitzpatrick et al. | 73/300 |
| 6,019,003 A * | 2/2000 | Wieder | 73/861.79 |
| 6,065,352 A | 5/2000 | Schieber | 73/861.79 |
| 6,481,293 B1 * | 11/2002 | Walczak et al. | 73/861.77 |
| 7,093,503 B1 * | 8/2006 | Hays et al. | 73/861.79 |
| 7,650,801 B2 | 1/2010 | Kuhlemann | 73/861.79 |
| 7,665,368 B2 | 2/2010 | Lincoln et al. | 73/861.12 |
| 7,997,150 B2 * | 8/2011 | Cooper | 73/861.94 |
| 8,006,569 B2 | 8/2011 | Gogge et al. | 73/861.12 |
| 8,397,586 B2 | 3/2013 | Sorenson et al. | 73/861.52 |
| 2003/0062300 A1 | 4/2003 | Okano et al. | 210/443 |
| 2012/0090406 A1 * | 4/2012 | Etter et al. | 73/861.79 |
| 2012/0090472 A1 | 4/2012 | Etter et al. | 99/275 |

FOREIGN PATENT DOCUMENTS

| | | |
|---|---|---|
| DE | 102006036948 A1 | 2/2008 |
| EP | 0 841 547 A2 | 5/1998 |
| EP | 2 017 585 A1 | 1/2009 |
| JP | 60-106122 A | 6/1985 |
| JP | 61-219835 | 9/1986 |
| JP | 02-135820 A | 5/1990 |
| JP | 07-167689 A | 7/1995 |
| JP | 2001-077920 A | 3/2001 |
| JP | 2001276816 | 10/2001 |
| JP | 2002005701 | 1/2002 |
| JP | 2003-042819 A | 2/2003 |
| JP | 2005003552 | 1/2005 |
| JP | 2005105059 | 4/2005 |
| JP | 2008-096394 A | 4/2008 |
| JP | 2008-164544 A | 7/2008 |
| JP | 2008209260 | 9/2008 |
| JP | 2008215868 | 9/2008 |
| WO | WO 2009/043865 A2 | 4/2009 |
| WO | WO 2009/074550 A2 | 6/2009 |
| WO | WO 2009/130099 A1 | 10/2009 |

OTHER PUBLICATIONS

Digmesa Data Sheet for Part No. 932-8503xxx, XP002567763, http://web.archive.org/web/20060319145216/www.digmesa.com/digmesa/upload/pdf/FHKSC/932-8503xxx_GB.pdf ; (2006).

Digmesa AG: Mar. 19, 2006, Data Sheet, "FHKSC Arnite using fastening pin with double pulse, Part No. 932-8503/XXX". Retrieved from the Internet, URL: http://web.archive.org/web/20060319145216/www.digmesa. com/digmesa/upload/pdf/fhksc/932-8503xxx_GB.pdf (retrieved on Feb. 9, 2010).

* cited by examiner

FLOWMETER STRUCTURE FOR A BEVERAGE MACHINE

This application is a 371 filing of International Patent Application PCT/EP2010/058691 filed Jun. 21, 2010.

FIELD OF THE INVENTION

The field of the invention pertains to flowmeters, in particular to their structure for beverage preparation machines.

For the purpose of the present description, a "beverage" is meant to include any liquid food, such as tea, coffee, hot or cold chocolate, milk, soup, baby food, etc . . .

BACKGROUND ART

Certain beverage preparation machines use capsules containing ingredients to be extracted or to be dissolved; for other machines, the ingredients are stored and dosed automatically in the machine or else are added at the time of preparation of the drink.

Various beverage machines, such as coffee machines, are arranged to circulate liquid, usually water, from a water source that is cold or heated by heating means, to a mixing or infusion chamber where the beverage is actually prepared by exposing the circulating liquid to a bulk or pre-packaged ingredient, for instance within a capsule. From this chamber, the prepared beverage is usually guided to a beverage dispensing area, for instance to a beverage outlet located above a cup or mug support area comprised or associated with the beverage machine. During or after the preparation process, used ingredients and/or their packaging is evacuated to a collection receptacle.

Most coffee machines possess filling means that include a pump for liquid, usually water, which pumps the liquid from a source of water that is cold or indeed heated through heating means, such as a heating resistor, a thermoblock or the like. For instance, U.S. Pat. No. 5,943,472 discloses a water circulation system for such a machine between a water reservoir and a hot water or vapour distribution chamber, for an espresso machine. The circulation system includes valves, a metallic heating tube and a pump that are interconnected with each other and with the reservoir via a plurality of silicone hoses that are joined together by clamping collars.

To control the characteristics of the liquid circulated to the mixing or infusion chamber, e.g. quantity and/or speed, such machines typically include a flowmeter. The flowmeters used in such beverage machines are made of food safe materials at least where exposed to the circulating fluid and have to be economically affordable to be used in such machines.

For instance, EP 0 841 547 discloses a flowmeter commercialised by DIGMESA which is suitable for beverage preparation machines. This flowmeter has a two-part housing with a bayonet connection, the housing containing an inner measuring chamber with a central fixed shaft extending therethrough for mounting an inner rotatable measuring body with fins that are located in the flow path and that are driven thereby. The flow of liquid passing through the measuring chamber is derived from a measure of the speed of rotation of the rotatable measuring body using a Hall sensor. A drawback of this device lies in the large friction surface between the fixed shaft and the rotating measuring body which changes depending on the orientation of the flowmeter and which also affects the accuracy of the measure of the flow through the chamber.

U.S. Pat. No. 4,666,061 discloses a similar flowmeter for beverage dispenser lines for wine, mineral water or beer that can be easily disassembled and reassembled for cleaning. The flowmeter has a two-part housing assembled by a bayonet connector and enclosing a measuring chamber. The chamber contains a centred rotatable measuring body having a rotatable shaft held in pace by a pair of facing diamond point bearings mounted into the housing and extending into the chamber. A drawback of this device lies in the price of the diamond point bearings and the required assembly steps for mounting such point bearings into the housing of the flowmeter.

Hence, there is still a need to provide an accurate inexpensive flowmeter, in particular for use in a beverage preparation machine.

SUMMARY OF THE INVENTION

The invention thus relates to a flowmeter, in particular for a beverage preparation machine.

The flowmeter of the invention comprises: a moulded housing delimiting a measuring chamber; a rotatable measuring body having a rotatable shaft extending across the measuring chamber, e.g. a rotor or like element with flow intercepting parts such as fins or blades, typically an impeller; and point bearings for mounting and positioning opposite extremities of the rotatable shaft in the housing. Each point bearing is formed of a protruding part and a cooperating facing counter-part, in particular a recessed part, associated, respectively, with the housing and an extremity of the rotatable shaft, or vice versa. This protruding part and this counter-part are integrally formed with the moulded housing and the rotatable shaft.

Thus, the manufacturing costs of such flowmeter that does not require a diamond element for the bearing are significantly reduced. The two bearing parts can be formed during a moulding step of the components they are respectively associated with. The bearing parts are integrally formed with the static support component and with the moving measuring component, respectively, and no separate assembly step is required therefor which limits the production costs. The accuracy of the flowmeter is however largely independent from the orientation of the flowmeter. The protruding part and/or counter-part of each point bearing can be made by fusion/solidification and/or polymerization of materials, usually by moulding these materials.

In so far as the flowmeter is used in a beverage preparation machine, the materials forming the chamber and the rotatable measuring body with the shaft should be food safe. Furthermore, they should have a low friction coefficient and a low abrasion rate and be well controllable in the manufacturing/moulding process so as to achieve high dimensional precision to provide a high quality flowmeter at limited cost. Moreover, these materials should be so controllable in the manufacturing process as to permit the formation of small-sized reliable parts to be able to reduce the size of the device in which such a flowmeter is integrated fur use. All these requirements are fulfilled by using the abovementioned materials, in particular in combination.

Therefore, the protruding part and counter-part of each point bearing may have a friction coefficient in the range of 0.1 to 0.8, in particular from 0.2 to 0.4, under wet conditions. The protruding part and counter-part of each point bearing can have an abrasion rate in the range of 0.05 to 10 µm/km in particular from 0.1 to 1.5 µm/km.

In one embodiment, the protruding part and/or counter-part of each point bearing are respectively made of POM (e.g. polyoxymethylene or polyformaldehyde), such as Schulaform 9A, and PBT (e.g. polybutyleneterephthalate), such as Tecdur GK30, or vice versa. The friction coefficient of such a combination of materials is typically of about 0.45 under dry conditions. The abrasion rate of the POM material against the PBT material is of about 0.2 µm/km. The abrasion rate of the PBT material against the POM material is of about 0.7 µm/km. Moreover, such POM and PBT materials are food safe.

The housing and/or the shaft are made of a composite material containing a bonding material and a stabilising filler such as beads, in particular glass beads. The composite material may contain 10 to 70 vol % filler material, in particular 15 to 50 vol % such as 20 to 40 vol %. The use of a filler material such as beads leads to an increased control of the shrinkage of the composite material when it consolidates during the moulding step. This is particularly desirable for insuring a high dimensional precision of the relatively movable parts and for a proper assembly of the parts. Moreover, the use of beads instead of fibres, e.g. glass fibres, as a filler material provides clean surfaces which can be manufactured with tight tolerances in particular for the bearings. Furthermore, the use of beads as a filler material reduces the friction coefficient and abrasion rate compared to the use fibre material as a filler. The components produced from such a composite material also exhibit a high stability, in particular for the connecting part, as discussed below.

The housing can be made of two assembled moulded bodies. For instance, the housing is assembled from a cup-like body and a cover body. Typically, the rotatable shaft has a rotation axis that extends between a point bearing located at the cover body and a facing point bearing located in the cup-like body. The cup-like body can have a rim forming a reference surface perpendicular to the shaft's rotation axis, the cover body having an inner face that is urged against the reference surface for precisely setting a spacing between the point bearings so as to hold and allow free rotation of the shaft therebetween.

Moreover, the cup-like body can have a rim and the cover body a seal lip, the seal lip being force-fitted into the rim, or vice versa, for sealing the cover body on the cup-like body. A sealing ring, such as an o-ring can be provided between the two assembled moulded bodies for sealing.

The bodies can be mechanically secured to each other by a snap, latch, clamp or hook arrangement, in particular by a bayonet connection.

Each of the moulded bodies may have a through-opening communicating with the measuring chamber for circulating liquid through such flowmeter. Alternatively, the liquid inlet and outlet of flowmeter can be located on the same body.

In one embodiment, the housing comprises facing protrusions extending into the chamber for forming the point bearings. Alternatively, the protrusions may be located on the shaft of the measuring body. It is also possible to provide a mixed configuration, i.e. a first bearing with the protrusion on the shaft and a second (opposite) bearing with the protrusion on the housing.

The housing may comprise a connecting arrangement for disconnectably connecting a sensor device thereto, in particular a Hall sensor device.

A further aspect of the invention concerns a beverage preparation machine having a liquid circulation circuit, in particular a water circulation circuit, that comprises a flowmeter as described above.

For instance, the machine is a coffee, tea or soup machine, in particular a machine for preparing within an extraction unit a beverage by passing hot or cold water or another liquid through a capsule or pod containing an ingredient of the beverage to be prepared, such as ground coffee or tea or chocolate or cacao or milk powder. The machine may comprise a brewing unit for housing this ingredient. Typically, the machine includes one or more of a pump, heater, drip tray, ingredient collector, liquid tank and fluid connection system for providing a fluid connection between the liquid tank and the brewing unit, etc . . . The configuration of a fluid circuit between the liquid reservoir and a heater for such a machine is for example disclosed in greater details in co-pending application PCT/EP08/067072.

BRIEF DESCRIPTION OF THE DRAWINGS

The invention will now be described with reference to the schematic drawings, wherein.

DETAILED DESCRIPTION

Figure 1:
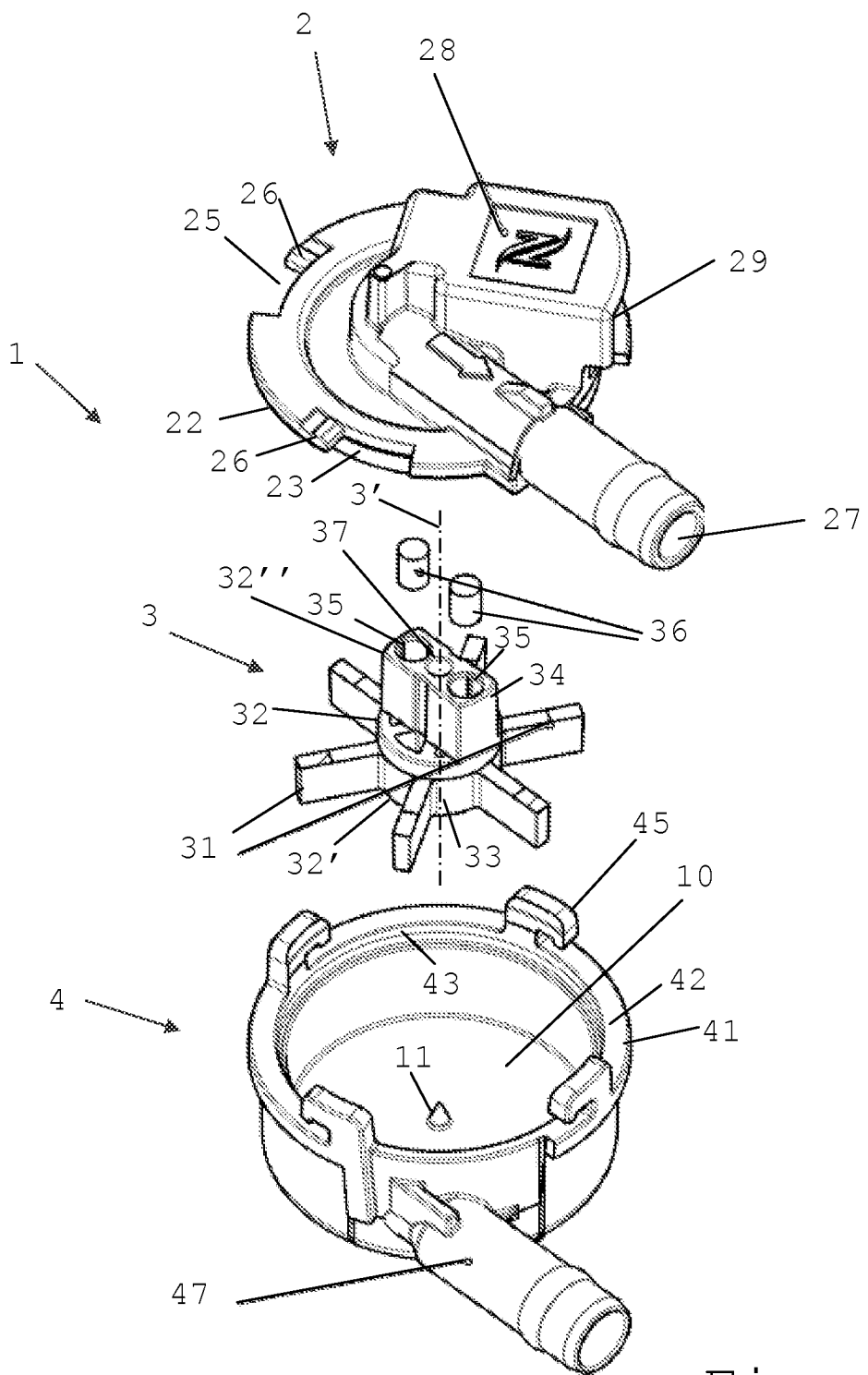
FIG. 1 shows an exploded view of a flowmeter according to the invention, the assembled flowmeter being shown in FIG. 2.
Figure 2:
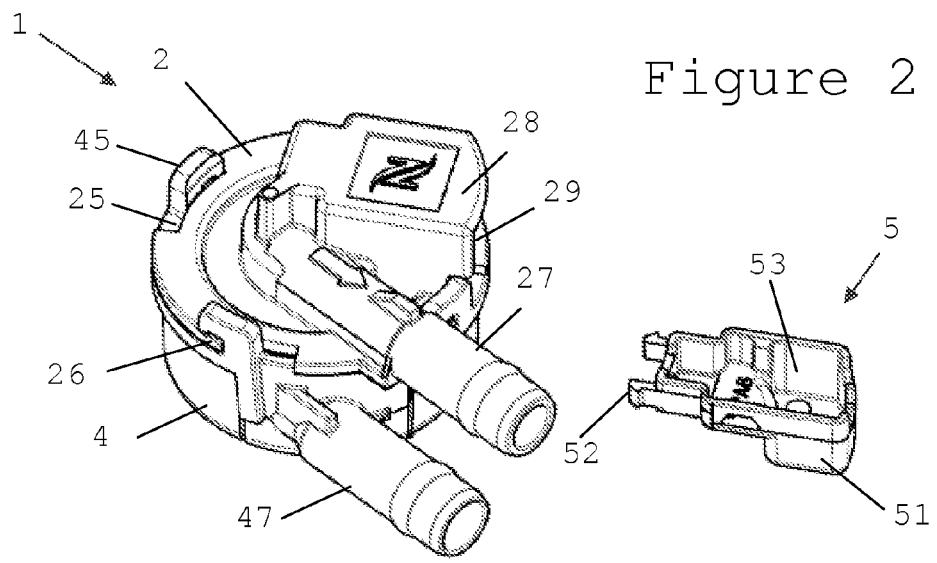

FIGS. 1 and 2 illustrate a flowmeter 1 typically for a beverage preparation machine such as a coffee machine. The flowmeter may be mounted in the fluid circuit of the beverage preparation machine as for example described in greater details in PCT/EP09/053368.

Flowmeter 1 has a housing formed of two assembled moulded bodies 2,4 delimiting an internal generally cylindrical measuring chamber 10. For example, the housing is formed by injection moulding.

Housing 2,4 contains a rotatable measuring body 3 in the form of a rotor or impeller. Body 3 has a series of radial members 31, e.g. fins or blades, on a rotatable shaft 32 extending centrally across the measuring chamber 10. Shaft 32 has a lower part 33 from which radial members 31 extend and an upper part 34. Two cavities 35 are provided in upper part 34 for housing a pair of magnets 36 of corresponding shape.

Flowmeter 1 has upper and lower point bearings for mounting opposite extremities 32',32" of rotatable shaft 32 in housing bodies 2,4. These point bearings are formed by protrusions of housing 2,4 extending into chamber 10 and by recesses in extremities 32',32" of rotatable shaft 32 forming a positioning counter-part for the protrusion, a lower protrusion in the form of a pin 11 and an upper recess 37 of this type forming part of the lower and upper bearings can be seen in FIG. 1. The lower and upper bearings are identical to ensure similar performance in all possible orientations.

In accordance with the invention, protrusions 11 and counter-parts 37 are integrally formed with the moulded housing bodies 2,4 and the rotatable shaft 32, respectively. In other words no additional component is needed for forming the bearing parts of the flowmeter. These may be moulded directly with the respective components, i.e. housing bodies 2,4 and shaft 32. The shaft or even the entire impeller 3 (except magnets 36) may be made of POM; housing 2,4 may be made of PBT with 30 vol % glass beads as a filler.

As illustrated in FIG. 1, lower housing body 4 is in the general shape of a cup and upper housing body 2 is in the general shape of a cover. It is understood that the lower and upper orientation merely refer to the particular orientations of the flowmeter as illustrated in the Figures. During use, flowmeter 1 may take any orientation or even change orientation.

Rotatable shaft 32 has a rotation axis 3' that extends between a point bearing (not shown) located at cover body 2 and a facing point bearing 11 located in cup-like body 4.

Cup-like body 4 has a rim 41 forming a reference surface 42 perpendicular to rotation axis, cover body 2 having an inner face 22 that is urged on reference surface 42 for precisely setting a spacing between the point bearings 11 so as to hold and allow free rotation of shaft 32 therebetween.

Figure 4:
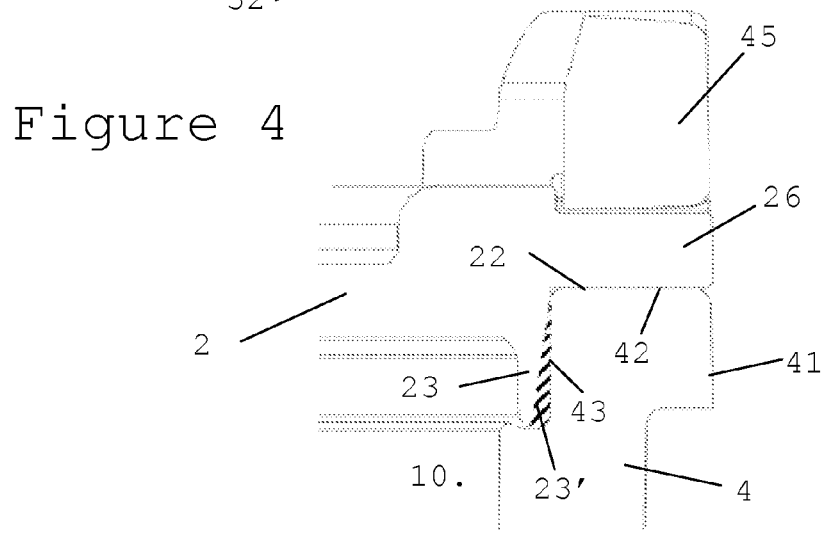
FIG. 4 illustrates part of the housing of such a flowmeter.

Furthermore rim 41 has an upright inner surface 43 cooperating with a corresponding seal lip 23 of cover body 2 for sealing cover body 2 on cup body 4 by force-fitting of lip 23 into the rim 41. This assembly is shown in greater details in the cross-section of FIG. 4, in which the same numeric references designate the same elements. A hatched part 23' illustrates the deformation of lip 23 due to the force fitting. In a variation, lip 23 and rim 41 may be welded, e.g. by ultrasonic welding, in which case hating 23' would illustrate the welded portions.

Cup-like body 4 has four spaced apart hooks 45 that are evenly distributed on rim 41 and that cooperate with corresponding passages 25 and hook retaining parts 26 at the periphery of cover body 2 to form a bayonet connection. As the locking movement of cover body 2 on cup body 4 is in a plane perpendicular to shaft 32 and rotational axis 3', the spacing between the point bearings is not affected by this locking. This spacing is entirely determined by the geometry (and position) of reference surface 42 so that tight tolerances for the bearings can be provided even though they are formed by moulding and not by additional diamonds.

Each of the moulded bodies 2,4 has a through-opening communicating with measuring chamber 10 for circulating liquid through such flowmeter. A tubular inlet 47 is provided in cup-like body 4 and a tubular outlet 27 is provided in cover body 2. The inlet and the outlet could of course be switched. Moreover, the inlet and the outlet could be located on the same moulded body.

Figure 3:
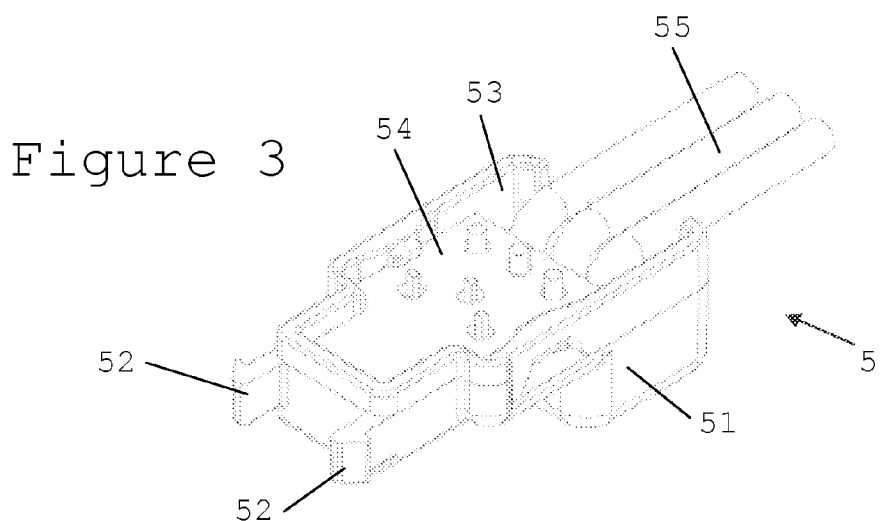
FIG. 3 illustrates part of an electric connector for such a flowmeter.

Furthermore, cover body 2 has a socket 28 with a cavity 29 for receiving a sensor plug 5 as shown in FIG. 2, the plug itself being illustrated in greater details in FIG. 3 in which the same numeric references designate the same elements.

Sensor plug 5 has a housing 51 which may be closed with a lid or otherwise sealed (not shown). Housing 51 has a pair of front hooks 52 for securing plug 5 in cavity 29 and delimits an inner chamber 53.

Chamber 53 contains a Hall sensor on a PCB 54 with cables 55 for connection to a control unit (not shown), for instance of a beverage preparation machine such as a coffee machine. To achieve a safe insulation of the PCB from any liquid circulating via chamber 10, a triple barrier is provided: the walls of socket 28 in cover body 2, housing 51 of plug 5 and a Kapton or other polyimide foil around PCB 54, whereby PCB 54 with the Hall sensor is safely sealed.

The Hall sensor, PCB 54, housing 51 and cavity 29 are so arranged and positioned that when plug 5 is secured in socket 28, the Hall sensor is situated above extremity 32" with magnets 36.

PCB 54 may be formed as part of a main board of the control unit to which cables 55 are connected. Hence, PCB 54 may be manufactured together with the control unit and then separated therefrom, e.g. cut away or broken off along a weakened line, before or after assembly of plug 5 before or after connection of cables 55, and then secured with plug 5 into socket 28. Hence, the manufacturing of the sensor device and its control unit can be simplified and optimised. In some embodiment, the flowmeter may even be mounted directly onto the main board so that PCB 54 is an integral part of the main board and remains an integral part of the main board of the control unit, for instance as illustrated in greater details in WO 2009/043865 and in PCT/EP09/053368.

During use of flowmeter 1, liquid is circulated from inlet 47 to outlet 27 via chamber 10. The flow of liquid will be intercepted by blades 31 thus driving shaft 32 in rotation about axis 3' between the point bearings at extremities 32',32" of shaft 32. The speed of rotation of shaft 32 will be proportional to the flow of liquid in chamber 10 and driving measuring body 3. By rotating shaft 32, magnets 36 are rotated adjacent to the Hall sensor on PCB 54 that will detect the rotating magnetic field generated by the magnets and convert it into a corresponding electric signal having a frequency corresponding to the speed of rotation of shaft 32. The information regarding the flow of liquid will then be communicated to a control unit via cables 55.

What is claimed is:

1. A flowmeter comprising:
a moulded housing delimiting a measuring chamber;
a rotatable measuring body having a rotatable shaft extending across the measuring chamber; and
point bearings for mounting and positioning opposite extremities of the rotatable shaft in the housing, each point bearing being formed of a protruding part and a cooperating facing counter-part part, associated, respectively, with the housing and an extremity of the rotatable shaft, or vice versa,
wherein the protruding part and counter-part are integrally formed with their associated moulded housing and rotatable shaft.

2. The flowmeter of claim 1, wherein the protruding part and counter-part of each point bearing have a friction coefficient in the range of 0.1 to 0.8 under wet conditions.

3. The flowmeter of claim 1, wherein the counter-part part is a recessed part and wherein the protruding part and counter-part of each point bearing have a friction coefficient in the range of 0.2 to 0.4 under wet conditions.

4. The flowmeter of claim 1, wherein the protruding part and counter-part of each point bearing have an abrasion rate in the range of 0.05 to 10 μm/km.

5. The flowmeter of claim 1, wherein the protruding part and counter-part of each point bearing are respectively made of one of polyoxymethylene, polyformaldehyde or polybutyleneterephthalate.

6. The flowmeter of claim 1, wherein the housing or the shaft, or both, are made of a composite material containing a bonding material and a stabilising filler, the composite material including 10 to 70 vol % of filler material.

7. The flowmeter of claim 6, wherein the stabilizing filler comprises glass beads.

8. The flowmeter of claim 1, wherein the housing is made of two assembled moulded bodies.

9. The flowmeter of claim 8, wherein the two bodies of the housing are a cup-like body and a cover body.

10. The flowmeter of claim 9, wherein the rotatable shaft has a rotation axis that extends between a point bearing located in the cover body and a facing point bearing located in the cup-like body.

11. The flowmeter of claim 10, wherein the cup-like body has a rim forming a reference surface perpendicular to the rotation axis of the shaft, the cover body having an inner face that is urged against the reference surface for precisely setting a spacing between the point bearings so as to hold and allow free rotation of the shaft therebetween.

12. The flowmeter of claim 9, wherein the cup-like body has a rim and wherein the cover body has a seal lip the seal lip being force-fitted into the rim, or vice versa, for sealing the cover body on the cup-like body.

13. The flowmeter of claim 9, wherein the bodies are assembled by a snap, latch, clamp or hook arrangement.

14. The flowmeter of claim 9, wherein the bodies are assembled by a bayonet connection.

15. The flowmeter of claim 9, wherein each of the moulded bodies has a through-opening communicating with the measuring chamber for circulating liquid therethrough.

16. The flowmeter of claim 1, wherein the housing comprises facing protrusions extending into the chamber for forming the point bearings.

17. The flowmeter of claim 1, wherein the housing comprises a connecting arrangement for disconnectably connecting a sensor device thereto.

18. The flowmeter of claim 1 further comprising a connecting arrangement for disconnectably connecting a sensor device to the housing.

19. A beverage preparation machine having a circulation circuit for water or another liquid that comprises a flowmeter as defined in claim 1.

* * * * *